Oct. 14, 1952     F. BANGERTER     2,613,743
DIE ASSEMBLY FOR STRIKING TABS FROM MOLDING RETAINER
STRIPS OR OTHER SIMILAR WORKPIECES

Filed Feb. 12, 1949     2 SHEETS—SHEET 1

INVENTOR.
Fred Bangerter.
BY
Harness, Dickey & Pierce
ATTORNEYS.

Oct. 14, 1952     F. BANGERTER     2,613,743
DIE ASSEMBLY FOR STRIKING TABS FROM MOLDING RETAINER
STRIPS OR OTHER SIMILAR WORKPIECES
Filed Feb. 12, 1949     2 SHEETS—SHEET 2
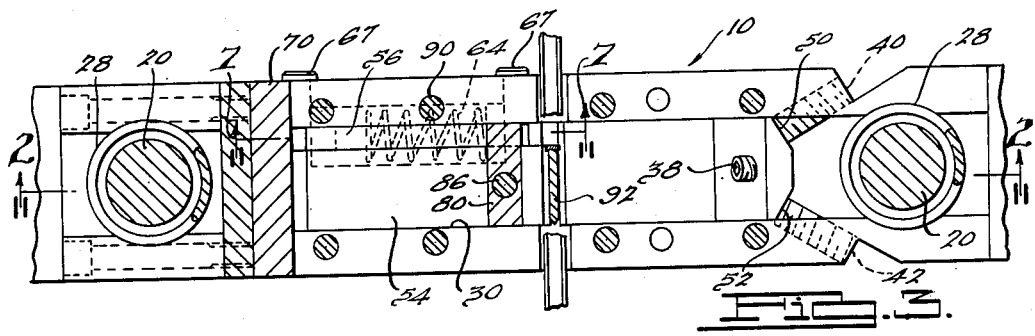
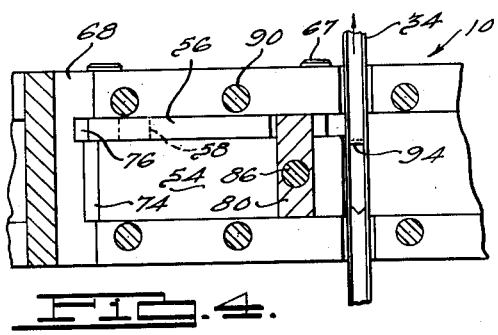
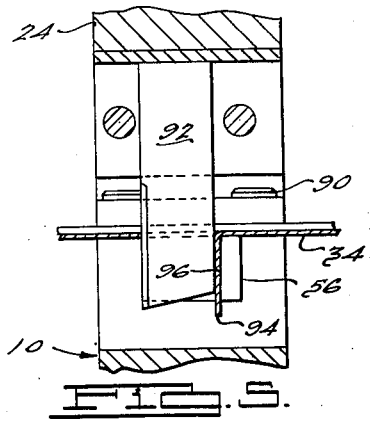
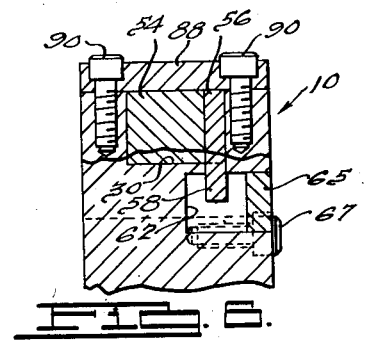
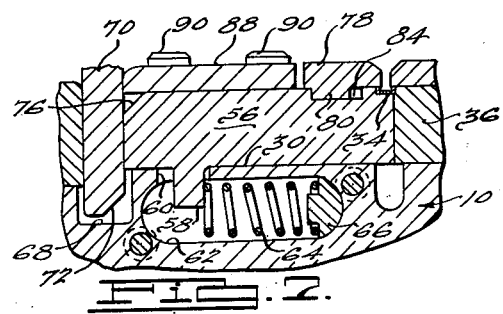
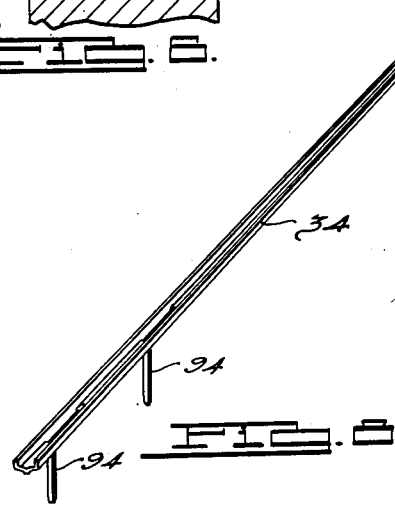
INVENTOR.
Fred Bangerter.
BY
Harness, Dickey & Pierce.
ATTORNEYS.

Patented Oct. 14, 1952

2,613,743

UNITED STATES PATENT OFFICE 2,613,743

DIE ASSEMBLY FOR STRIKING TABS FROM MOLDING RETAINER STRIPS OR OTHER SIMILAR WORKPIECES

Fred Bangerter, St. Clair Shores, Mich., assignor to Herron-Zimmers Moulding Company, Detroit, Mich., a corporation of Illinois Application February 12, 1949, Serial No. 76,122

7 Claims. (Cl. 164—87)

The present invention relates to a die assembly for striking tabs from moulding strips and other similar workpieces.

It is an object of the present invention to provide an improved die assembly of the above-mentioned type which is simple in construction, economical of manufacture, and reliable and efficient in operation.

Another object of the present invention is to provide an improved die assembly for striking tabs from moulding strips and other similar workpieces and which accurately positions the tabs to permit a plurality of tabs spaced along the strip to be readily aligned with and inserted into similarly spaced apertures in an associated workpiece.

A further object of the present invention is to provide an improved die assembly of the above-mentioned type including a back-up element movable into and out of the path of movement of a tab struck from the workpiece by the die assembly during movement of the workpiece preparatory to a subsequent operation of the die assembly and adapted to cooperate with the punch element of the die assembly to accurately control the position to which a tab struck out of the workpiece by the punch element is moved by the punch element.

It is also an object of the present invention to provide an improved die assembly including a back-up element of the just mentioned type and means for slidably supporting and releasably gripping a strip or other similar workpiece and including a movable supporting element having a lost-motion connection with the back-up element thereby permitting the travel of the back-up element to be substantially greater than that of the movable supporting element.

Other and more detailed objects of the present invention will become apparent from a consideration of the following specification, the appended claims, and the accompanying drawings throughout the several views of which like reference characteristics designate like parts.

In the drawings:

Fig. 3 is a broken view in cross section of the construction shown in Fig. 2 taken along the line 3—3 thereof;

Fig. 4 is an enlarged broken view in cross section of the construction illustrated in Fig. 1 taken along the line 4—4 thereof and showing the position of the tab after the operation of the die assembly;

Figure 2:
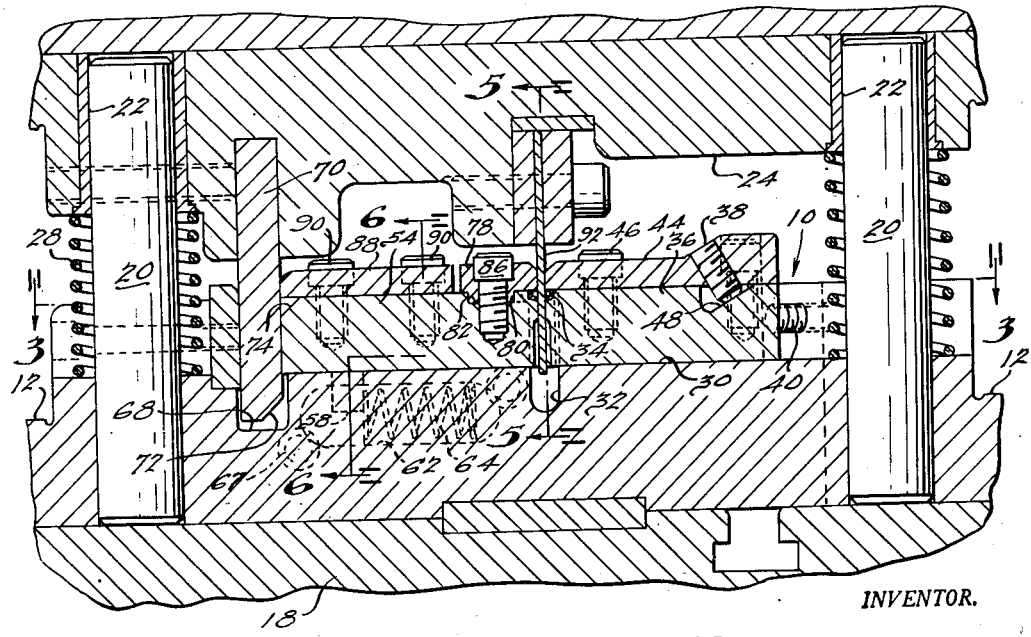
Fig. 2 is a broken view in cross section taken along the line 2—2 of Fig. 3, and showing the die assembly in the closed position.

Figs. 5 and 6 are broken views in cross section of the construction illustrated in Fig. 2 taken respectively along the lines 5—5 and 6—6 thereof;

Fig. 7 is a broken view in cross section of the construction illustrated in Fig. 3 taken along the line 7—7 thereof; and, Fig. 8 is a view in perspective of a moulding retainer strip from which two tabs have been struck by the die assembly illustrated in Figs. 1 through 7 inclusive.

Referring to the drawings, the die assembly comprises a generally rectangular stationary lower die member 10 having outwardly extending end portions 12 and 14 which are adapted to be engaged by clamps 16 for rigidly anchoring the die member 10 to the bed 18 of an associated machine or press adapted to operate the die assembly. This die member 10 carries a pair of vertically disposed spaced guide bars 20 rigidly fixed therein, the upper end portions of which slidably fit bushings 22 carried by an upper movable die member 24 which is slidable along the guide bars 20 toward and away from the lower stationary die member 10. In operation of the die assembly, the upper movable die member 24 is forced downwardly toward the lower die member 10 by a movable operating head 26 of the associated press or machine in which the die assembly is mounted, and upon withdrawal of the operating head 26 the upper die member 24 is forced upwardly to the open position illustrated in Figure 1 by coil springs 28 encircling the guide bars 20 and engaging the die members 10 and 24 at their opposite ends.

The lower die member 10 has a channel 30 extending longitudinally thereof and has a generally centrally disposed slot 32 extending transversely thereof and to a depth below the bottom of the channel 30. The workpiece, which for illustrative purposes is shown in the drawings as the moulding retainer strip 34, extends transversely of the die member 10 in the slot 32 and is supported at the right-hand side of the slot 32, as viewed in Figs. 1, 2, 3, 4 and 7, by a stationary supporting slot 36 mounted in and adjustable longitudinally of the channel 30. The just-mentioned adjustment of the supporting element 36 is effected by means of set screws 38, 40 and 42, the first of which is mounted in a cover plate 44 spanning the channel 30 above the supporting element 36 and secured to the die member 10 at opposite sides of the channel 30 by screws 46. The set screw 38 is disposed at an angle to the vertical as best illustrated in Fig. 2, and engages an inclined surface 48 presenting upwardly and to the left as viewed in Fig. 2, forming a part of the upper surface of the supporting element 36. The other set screws 40 and 42, best illustrated in Fig. 3, are mounted in the lower die member 10 with their inner ends extending through the side walls of and into the channel 30 and engaging oblique surfaces 50 and 52, respectively, best illustrated in Figure 3, formed on the right-hand end of the supporting element 36 adjacent the opposite side walls of the channel 30. It will now be appreciated that by proper adjustment of the set screws 38, 40 and 42 the supporting element 36 may be accurately adjusted longitudinally of the channel 30.

At the opposite side of the transversely extending slot 32, or to the left thereof as viewed in Figs. 1, 2, 3, 4 and 7, a movable supporting element 54 and a back-up element 56 are slidably mounted in the channel 30 in side-by-side relation, as best illustrated in Fig. 3. The adjacent upper edge portions of the supporting elements 36 and 54, and the upper edge portion of the back-up element 56 adjacent the supporting element 36, are recessed to receive and support the workpiece 34 as may best be seen in Figs. 2 and 7.

Adjacent its opposite or left-hand end the back-up element 56 is provided with an integrally formed depending finger 58 projecting downwardly through a slot 60 opening through the lower wall of the channel 30 into a spring cavity 62 formed in the lower die member 10. A coil spring 64 is mounted in the spring cavity 62 and engages the finger 58 at one end and a spring seat element 66 at its other end and continuously acts to urge the back-up element to its retracted position, or to the left as viewed in Figs. 1, 2, 3, 4 and 7. Access to the spring cavity 62 is provided through a plate 65 removably mounted in the side of the die member 10 by a pair of screws 67.

Adjacent the left-hand end of the back-up element 56 and the supporting element 54 a second transversely extending slot 68 is formed in the stationary die member 10 and is adapted to receive the lower portion of a cam plate 70 fixedly carried by and depending from the upper movable die member 24. The lower right-hand edge of the cam plate 70 is formed to define an inclined cam surface 72 adapted to engage cooperating inclined cam surfaces 74 and 76 formed at the upper left-hand edges of the supporting element 54 of the back-up element 56, respectively, to cam the elements 54 and 56 to the right to the positions illustrated in Figs. 2, 3 and 7 in which the workpiece 34 is gripped between and securely held by the stationary supporting element 36 and the movable supporting element 54 and in which the back-up element 56, which is slightly longer than the supporting element 54, extends beneath the workpiece 34 and substantially into engagement with the stationary supporting element as illustrated in Figs. 3 and 7.

Figure 1:
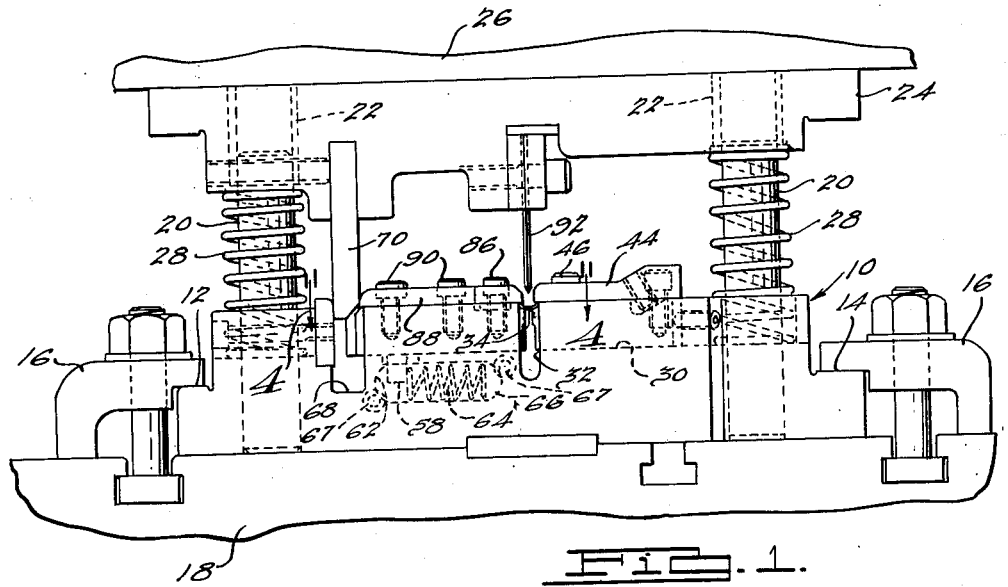
Figure 1 is a view in elevation of a die assembly embodying the present invention, showing the die assembly in the open position and showing fragmentary portions of an associated machine in which the die assembly is mounted.

A lost-motion connection between the movable supporting element 54 and the back-up element 56 is provided by a connecting link 78 extending transversely of the upper surface of the elements 54 and 56 and having a depending tongue 80 received in a closely fitting slot 82 extending transversely of the upper surface of the supporting element 54 in spaced relation to the right-hand end thereof, and projecting into a substantially wider slot 84 formed in the back-up element 56 and generally aligned with the slot 82. The connecting link 78 is rigidly connected to the movable supporting element 54 for movement therewith by the above mentioned engagement of the tongue 80 in the slot 82 and a screw 86 extending through the link 78 and threaded into the movable supporting element 54. A combined cover plate and stop member 88 overlies the upper surfaces of the elements 54 and 56 to the left of the connecting link 78 and is secured to the lower die member 10 at opposite sides of the channel 30 by screws 90. This stop member 88 and the connecting link 78 are proportioned to permit only a very slight travel of the movable supporting element 54 between its right-hand position to which it is cammed by the cam plate 70 and in which it cooperates with the stationary supporting die element 36 to firmly grip the workpiece 34, which position is illustrated in Figs. 2, 3 and 7, and its left-hand or retracted position illustrated in Figs. 1 and 4 in which the movable die element 54 cooperates with the stationary die element 36 to slidably support the workpiece 34 and which position is illustrated in Figs. 1 and 4. The tongue 80 on the connecting link 78 and the slot 84 in the back-up element 56 are so proportioned that the travel of the back-up element 56 is substantially greater than that of the movable supporting element 54 whereby, when the connecting link 78 engages the stop plate 88, the back-up element 56 is withdrawn to the position illustrated in Figs. 1 and 4 in which it is substantially withdrawn from beneath the workpiece 34.

A knife blade or punch element 92 is rigidly fixed to and depends from the die member 24. The punch element 92 is aligned with the slot 32 and is adapted to pass between and be guided by the adjacent end portions of the stationary plate 44 and the link 78 carried by the movable supporting element 54, when the latter is in its inner position in which it cooperates to grip the workpiece, as described above, and to pass between the adjacent end portions of the supporting elements 44 and 54. When the movable supporting element 54 is in the just mentioned inner position, the adjacent upper edges of the elements 44 and 54 extend under the outer portions of the workpiece and provide cutting edges adapted to cooperate with the blade element 92 and spaced apart a distance slightly greater than the thickness of the blade element 92 to provide a shearing clearance therewith. The provision of this shearing clearance greatly improves the life of the shearing edges on the elements 44, 54 and 92.

The relative lengths of the cam plate 72 and the punch element 92 are such that the movable supporting element 54 and the back-up element 56 are fully moved to their right-hand positions by the engagement of the cam surface 72 on the cam plate 70 and the cam surfaces 74 and 76 on the elements 54 and 56 prior to the engagement of the workpiece 54 by the lower end of the punch element 92. As best illustrated in Figure 5, the lower edge of the punch element 92 is inclined slightly relative to the horizontal so that a tab 94 is progressively cut from the workpiece 34 as the punch element 92 moves therethrough, and the rear or right-hand edge of the punch element 92, as viewed in Fig. 5, is vertically disposed and adapted to cooperate with the forward or left-hand face 96 of the back-up element 56 to accurately position the cut-out tab 94. This construction affords a simple and efficient means for insuring that each tab is accurately positioned and accordingly eliminates the difficulties previously encountered in simultaneously inserting a plurality of tabs on a single workpiece into similarly spaced apertures in an associated structure.

From the foregoing it will be appreciated that upon movement of the upper die member 24 downwardly toward the lower stationary die member 10 the cam plate 70 engages first the back-up member 56 and subsequently the movable supporting member 54 and cams them to the right to their operative positions after which the punch element 92 passes through the workpiece 34 and cuts the tab 94 therefrom and cooperates with the back-up plate 56 to accurately locate the tab 94. Upon movement of the upper die member 24 in the opposite direction, the punch element 92 is first withdrawn from the workpiece 34 and the cam plate 70 is then withdrawn from engagement with the movable supporting element 54 and the back-up element 56 permitting the spring 64 acting against the finger 58 of the back-up element 56 to move the back-up element toward its retracted position during the latter phase of which movement the back-up element 56 engages the depending tongue 80 of the connecting link 78 and through the link 78 moves the movable supporting element 56 to its retracted position.

While only one embodiment of the invention has been illustrated and described in detail it will be readily appreciated by those skilled in the art that numerous modifications and changes may be made therein without departing from the spirit of the invention.

What is claimed is:

1. A die assembly for striking tabs from moulding retainer strips and other similar workpieces, said die assembly comprising a stationary die member, a second die member, means mounting said second die member for reciprocatory movement toward and away from said stationary die member, means on one of said die members for supporting and releasably gripping a workpiece, said last-named means including a supporting element movable between a first position in which it is adapted to slidably support the workpiece and a second position in which it is adapted to hold the workpiece against movement, a punch element mounted on the other of said workpieces and adapted to strike a tab from said workpiece upon movement of said die member toward said stationary die member, a back-up element on said one of said members movable between an operative position in which it cooperates with said punch element to accurately control the position to which each tab is moved when it is struck out by said punch element and a retracted position in which it is out of the path of movement of the tab during sliding movement of the workpiece along the supporting means preparatory to a subsequent operation of the die assembly, and means effective in response to movement of said second member toward said stationary member to move said back-up element from said retracted position to said operative position and to move said supporting element from said first position to said second position and effective in response to movement of said second member in the opposite direction to move said back-up member from said operative position to said retracted position and to move said supporting member from said second position to said first position.

2. A die assembly for striking tabs from moulding retainer strips and other similar workpieces, said die assembly comprising a stationary die member, a second die member, means mounting said second die member for reciprocatory movement toward and away from said stationary die member, means on one of said die members for supporting and releasably gripping a workpiece, said last-named means including a supporting element movable between a first position in which it is adapted to slidably support the workpiece and a second position in which it is adapted to hold the workpiece against movement, a punch element mounted on the other of said workpieces and adapted to strike a tab from said workpiece upon movement of said die member toward said stationary die member, a back-up element on said one of said members movable between an operative position in which it cooperates with said punch element to accurately control the position to which each tab is moved when it is struck out by said punch element and a retracted position in which it is out of the path of movement of the tab during sliding movement of the workpiece along the supporting means preparatory to a subsequent operation of the die assembly, means continuously urging said back-up element toward said retracted position, cam means carried by said members and operable upon movement of said second member toward said stationary member to move said back-up element from said retracted position to said operative position, and means providing a lost-motion connection between said back-up element and said supporting element whereby upon movement of said back-up element from said operative position to said retracted position said supporting element is moved from said second position to said first position.

3. A die assembly for striking tabs from moulding retainer strips and other similar workpieces, said die assembly comprising a stationary die member, a second die member, means mounting said second die member for reciprocatory movement toward and away from said stationary die member, means on one of said die members for supporting and releasably gripping a workpiece, said last-named means including a supporting element movable between a first position in which it is adapted to slidably support the workpiece and a second position in which it is adapted to hold the workpiece against movement, a punch element mounted on the other of said die members and adapted to strike a tab from said workpiece upon movement of said second die member toward said stationary die member, a back-up element on said one of said members movable between an operative position in which it cooperates with said punch element to accurately control the position to which each tab is moved when it is struck out by said punch element and a retracted position in which it is out of the path of movement of the tab during sliding movement of the workpiece along the supporting means preparatory to a subsequent operation of the die assembly, means effective in response to movement of said second member toward said stationary member to move said back-up element from said retracted position to said operative position and to move said supporting element from said first position to said second position and effective in response to movement of said second member in the opposite direction to move said back-up member from said operative position to said retracted position and to move said supporting member from said second position to said first position, and stop means mounted on said one of said members adapted to prevent movement of said supporting element beyond said first position.

4. A die assembly for striking tabs from moulding retainer strips and other similar workpieces, said die assembly comprising a stationary die member, a second die member, means mounting said second die member for reciprocatory movement toward and away from said stationary die member, means on one of said die members for supporting and releasably gripping a work-piece, said last-named means including a supporting element movable between a first position in which it is adapted to slidably support the workpiece and a second position in which it is adapted to hold the workpiece against movement, a punch element mounted on the other of said workpieces and adapted to strike a tab from said workpiece upon movement of said die member toward said stationary die member, a back-up element on said one of said members movable between an operative position in which it cooperates with said punch element to accurately control the position to which each tab is moved when it is struck out by said punch element and a retracted position in which it is out of the path of movement of the tab during sliding movement of the workpiece along the supporting means preparatory to a subsequent operation of the die assembly, and means effective in response to movement of said second member toward said stationary member to move said back-up element from said retracted position to said operative position and to move said supporting element from said first position to said second position and effective in response to movement of said second member in the opposite direction to move said back-up member from said operative position to said retracted position and to move said supporting member from said second position to said first position, said punch element and said last-named means being so constructed and arranged that said back-up element is moved to said operative position and said supporting element is moved to said second position prior to the engagement of said workpiece by said punch element.

5. A die assembly for striking tabs from moulding retainer strips and other similar workpieces, said die assembly comprising a stationary die member, a second die member, means mounting said second die member for reciprocatory movement toward and away from said stationary die member, means on one of said die members for supporting and releasably gripping a workpiece, said last-named means including a supporting element movable between a first position in which it is adapted to slidably support the workpiece and a second position in which it is adapted to hold the workpiece against movement, a punch element mounted on the other of said workpieces and adapted to strike a tab from said workpiece upon movement of said die member toward said stationary die member, a back-up element on said one of said members movable between an operative position in which it cooperates with said punch element to accurately control the position to which each tab is moved when it is struck out by said punch element and a retracted position in which it is out of the path of movement of the tab during sliding movement of the workpiece along the supporting means preparatory to a subsequent operation of the die assembly, and means effective in response to movement of said second member toward said stationary member to move said back-up element from said retracted position to said operative position and to move said supporting element from said first position to said second position and effective in response to movement of said second member in the opposite direction to move said back-up member from said operative position to said retracted position and to move said supporting member from said second position to said first position, said punch element and said last-named means being so constructed and arranged that upon movement of said second member toward said stationary member said back-up element is moved to said operative position and said supporting element is moved to said second position prior to the engagement of said workpiece by said punch element and upon movement of said second member in said opposite direction said punch element is withdrawn from said workpiece prior to the movement of said supporting element from said second position to said first position.

6. A die assembly for striking tabs from moulding retainer strips and other similar workpieces, said die assembly comprising a stationary die member, a second die member, means mounting said second die member for reciprocatory movement toward and away from said stationary die member, means on one of said die members for supporting and releasably gripping a workpiece, said last-named means including a supporting element movable between a first position in which it is adapted to slidably support the workpiece and a second position in which it is adapted to hold the workpiece against movement, a punch element mounted on the other of said members and adapted to strike a tab from said workpiece upon movement of said second die member toward said stationary die member, a back-up element on one of said members movable between an operative position in which it cooperates with said punch element to accurately control the position to which each tab is moved when it is struck out by said punch element and a retracted position in which it is out of the path of movement of the tab during sliding movement of the workpiece along the supporting means preparatory to a subsequent operation of the die assembly, means continuously urging said back-up element toward said retracted position, said back-up element and said supporting element having cam surfaces formed thereon, a cam element mounted on said other of said members and adapted to engage said cam surfaces on said back-up element and said supporting element upon movement of said second die member toward said stationary die member to cam said back-up element from said retracted position to said operative position and to cam said supporting element from said first position to said second position prior to engagement of said workpiece by said punch element, and means providing a lost-motion connection between said back-up element and said supporting element for moving said supporting element from said second position to said first position upon movement of said back-up element from said operative position to said retracted position.

7. A die assembly for striking tabs from moulding retainer strips and other similar workpieces, said die assembly comprising a stationary die member, a second die member, means mounting said second die member for reciprocatory movement toward and away from said stationary die member, means on one of said die members for supporting and releasably gripping a workpiece, said last-named means including a stationary supporting element, adjustable means for accurately positioning said stationary supporting element relative to said one of said die members, and a movable supporting element movable between a first position in which said supporting elements cooperate to slidably support said workpiece and a second position in which said supporting elements are adapted to firmly grip said workpiece, a punch element mounted on the other of said members and adapted to strike a tab from said workpiece upon movement of said second die member toward said stationary die member, a back-up element on said one of said members movable between an operative position in which it cooperates with said punch element to accurately control the position to which each tab is moved when it is struck out by said punch element and a retracted position in which it is out of the path of movement of the tab during sliding movement of the workpiece along the supporting means preparatory to a subsequent operation of the die assembly, and means effective in response to movement of said second member toward said stationary member to move said back-up element from said retracted position to said operative position and to move said movable supporting element from said first position to said second position and effective in response to movement of said second member in the opposite direction to move said back-up member from said operative position to said retracted position and to move said movable supporting element from said second position to said first position, the construction and arrangement of said punch element and said last-named means being such that during movement of said second member toward said stationary member said movable supporting element is moved from said first position to said second position to firmly grip said workpiece prior to the engagement of the latter by said punch element.

FRED BANGERTER.

REFERENCES CITED

The following references are of record in the file of this patent:

UNITED STATES PATENTS

| Number | Name | Date |
| --- | --- | --- |
| 209,422 | Riethmuller | Oct. 29, 1878 |
| 654,607 | Colborne | July 31, 1900 |
| 1,335,908 | Mueller | Apr. 6, 1920 |